Sept. 30, 1958 R. E. ADAMS 2,854,130
VIBRATING CONVEYOR MOUNTING STRUCTURE
Filed Aug. 12, 1954 2 Sheets-Sheet 1
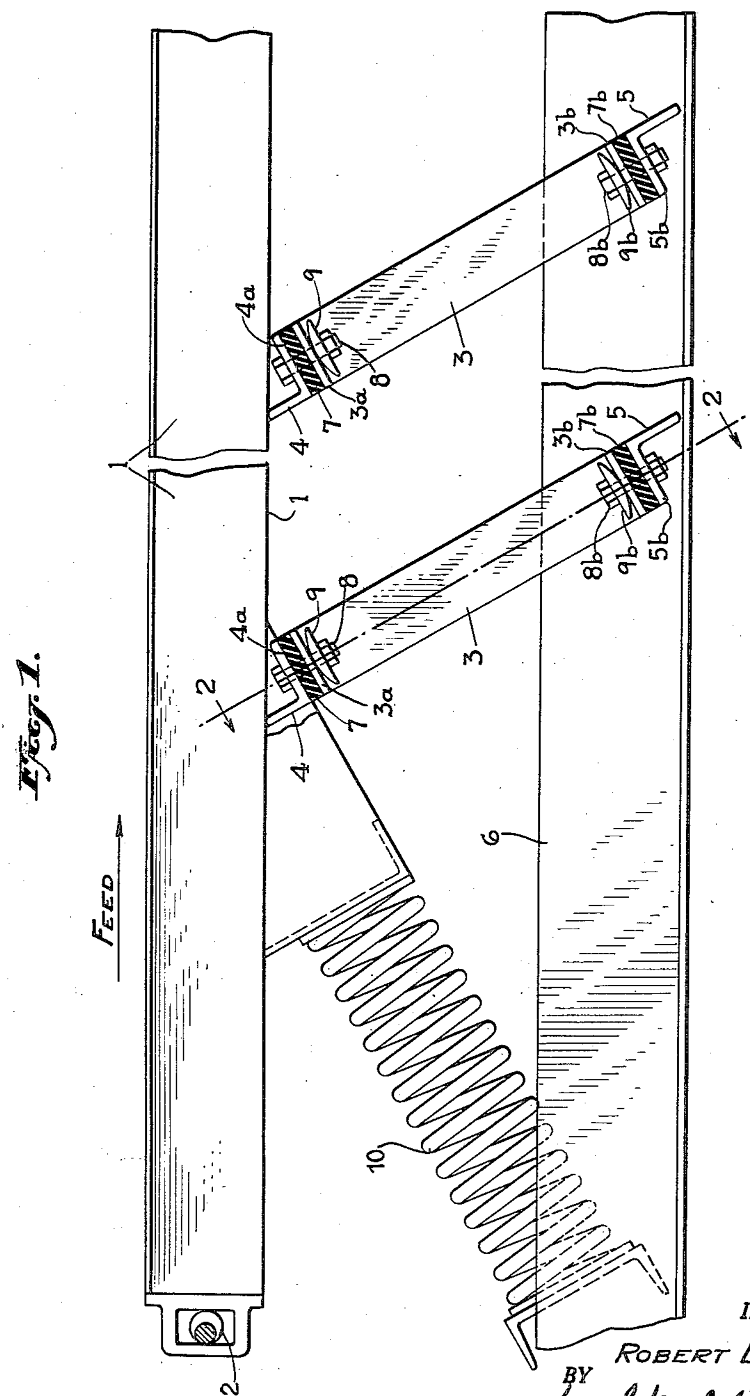

VIBRATING CONVEYOR MOUNTING STRUCTURE
Filed Aug. 12, 1954 2 Sheets-Sheet 2
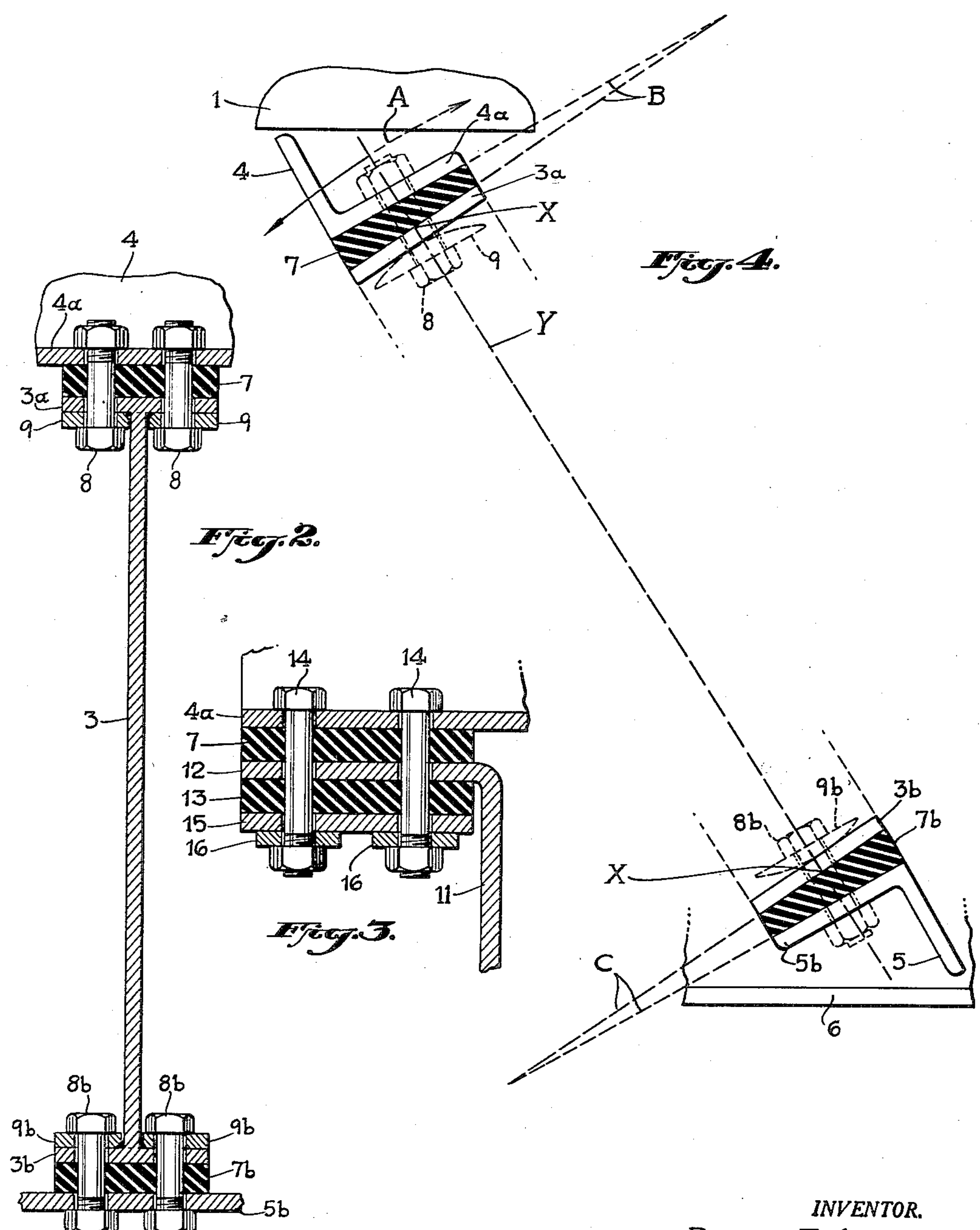
INVENTOR.
ROBERT E. ADAMS.
BY
Ward Neal Haselton Orme & McElhannon
ATTORNEYS.

United States Patent Office 2,854,130

Patented Sept. 30, 1958

2,854,130

VIBRATING CONVEYOR MOUNTING STRUCTURE

Robert E. Adams, Hudson, N. Y., assignor to Gifford-Wood Co., Hudson, N. Y., a corporation of New York Application August 12, 1954, Serial No. 449,441

3 Claims. (Cl. 198—220)

The invention relates to conveyors of the type in which feed of the conveyed material along the conveyor is secured by vibratory motion of the conveyor, and like equipment wherein material to be agitated is placed within or upon a vibrating carrier. In equipment of the above nature vibrations of objectionable magnitude are likely to be transmitted from the machine proper to the adjacent floor or other supporting framework and the invention aims primarily to provide mounting structure for guiding vibratory conveyors of the above nature which will effectively reduce the vibrational forces transmitted by the machine to the adjacent supporting structure, without the need of providing counterbalancing members or like bulky additional parts, and which will be simple, rugged and economical in construction and operation. Further objects and advantages of the invention will be in part obvious and in part specifically referred to in the description hereinafter contained which, taken in conjunction with the accompanying drawings, discloses a machine of preferred construction for carrying out the invention; the disclosure however should be considered as merely illustrative of the invention in its broader aspects.

In the drawings:

Fig. 1 is a side view of a vibrating conveyor having a mounting structure constructed to function in accordance with the invention.

Fig. 2 is a detail section on the broken line 2—2 of Fig. 1, looking in the direction of the arrows.

Fig. 3 is a view similar to the upper portion of Fig. 2, but showing a somewhat modified form of the invention.

Fig. 4 is a schematic view illustrative of the mode of operation of the mounting structure shown in Figs. 1 to 3.

The invention is disclosed as applied to a conveyor of the vibrating type, wherein loose material is to be fed progressively along a trough which has a back and forth motion in the line of feed, but usually accompanied by upward movement of the conveyor during its stroke in the direction of feed, and downward movement during the opposite stroke. Mechanism for imparting vibratory movements to the trough 1 is schematically indicated by the eccentric 2 at the left of Fig. 1, but will not be described in detail since appropriate mechanisms for the purpose are known in the art.

The invention is concerned particularly with the mounting structure provided to guide the trough 1 or equivalent carrier for material to be agitated, to guide the member 1 in its vibratory movements and in large part absorb the vibratory forces which otherwise would be transmitted to the adjacent flooring or other framework which supports the machine. In the form of the invention shown in Figs. 1 to 3, this mounting structure includes arms 3 which extend out obliquely from the conveyor, usually at an angle of about 60° to the direction of feed, an appropriate number of these arms being provided, which are located at points spaced transversely of the member 1 and also at points spaced longitudinally thereof, according to the size of the machine.

The arms are articulated at their opposite end portions respectively with respect to the conveyor member 1 and the supporting framework of the machine. In the form of the invention under discussion, fixtures as indicated at 4 and 5 are provided respectively adjacent the upper and lower ends of the arms 3. These fixtures may take the form of cross pieces of L-shaped cross section, the fixture 4 being affixed to the conveyor 1 to underlie the latter and the fixture 5 extending crosswise and being affixed at its opposite ends to main supporting beams 6 (Fig. 1) extending along the opposite sides of the machine.

In accordance with the invention, the arms 3 and the above mentioned fixtures, preferably at both ends of the arms, are provided with juxtaposed face portions and with resilient cushions of rubber-like material which are respectively juxtaposed in relation to their respectively adjacent face portions, and the above mentioned juxtaposed elements are clamped together so that relative angular displacement of the arms with respect to fixture 4 and conveyor 1, and with respect to the fixture 5 and adjacent main supporting framework, which will take place during the vibratory movements of the conveyor, will cause the above mentioned juxtaposed face portions to apply varying degrees of compression to various portions of the resilient cushions during different phases of the vibratory movements, as hereinafter more specifically discussed. As shown in Fig. 1, the face 4*a* of the fixture 4 acts as one of the above mentioned face portions, and is juxtaposed with respect to transverse flanges 3*a* at the upper ends of the arms 3. The resilent cushions 7 which may be for example of natural rubber of about 70 durometer test, are interposed between the face portions 3*a* and 4*a* above mentioned. Bolts 8 are shown in Figs. 1 and 2 as passing loosely through the face portions 3*a* and 4*a*, and also through the resilient cushions 7, it being understood that these bolts may be adjusted to apply different degrees of initial compression to the cushions as desired under different operating conditions. Preferably washers or plates 9 having a cylindrically convex surface bearing against their respectively adjacent face portions, are provided to facilitate relative angular movements of the arms 3 as hereinafter referred to more in detail.

Similarly at the bottom ends of the links 3, the face 5*b* of the fixture 5 may act as one of the face portions above referred to, and is juxtaposed with respect to parts 3*b*, 7*b*, 8*b* and 9*b* which are respectively similar to the above described elements 3*a*, 7, 8 and 9. The above described arms 3, having intermediate portions which terminate in the transversely extending face portions 3*a* and 3*b* at the opposite ends thereof, provide a structure which is I shaped in longitudinal section, with the elastic cushions 7 and 7*b* respectively lying against such transversely extending portions, and with clamping members 8 and 9*b* transversely offset with respect to the intermediate portions of the arms, and respectively gripping the corresponding juxtaposed face portions and cushion to hold the latter in juxtaposed relation.

Fig. 4 shows schematically the effect on the resilient cushions 7 and 7*b* of the vibratory movements of the conveyor 1 in the path indicated by the arrow A at the top of the diagram. The direction of feed of the material to be conveyed is toward the right in the figure and it will be noted that as the conveyor 1 moves toward the right, it has an upward component of motion as well as a horizontal component of motion toward the right. Conversely, as the conveyor 1 moves in the opposite direction, it has a downward component of motion as well as a horizontal component toward the left. Fig. 4 shows a phase of the vibratory movement in which the conveyor 1 has moved toward the left. In Fig. 4 the broken line Y indicates the center line of an arm 3, and it is assumed that the arm is so constructed as to be substantially rigid so that the surfaces of the face portions *3a* and *3b* are at all times directed substantially at right angles to the longitudinal axis Y of the arm. In other words, the arms 3 need not be made flexible or resilient. In the phase shown in Fig. 4, the arm and its face portions *3a* and *3b* have moved angularly out of parallelism with the face portions *4a* and *5b* as indicated respectively by the dotted lines B and C of Fig. 4, these angular movements taking place respectively about the axes marked X in the figure, with the result that increased compression is applied to the zone of the resilient cushion 7 which is at the right of the axis Y, while the compression in the zone of the cushion 7 which is at the left of axis Y is diminished. Conversely, the compression in the portion of the cushion *7b* which is at the left of the axis Y is increased, while the compression in the portion of the cushion *7b* which is at the right of the axis Y is diminished. When the conveyor 1 moves to the right, the converse action takes place, i. e. compression is diminished in portions of the cushions which were under increased compression during movement to the left, and increased in portions of the cushions which were under diminished compression during movement to the left. Angular movement of the arms with respect to the conveyor, or the supporting structure, and preferably both, is thus compelled to take place through transverse compression of the resilient cushions, with variations in the compression of different zones of the cushions as the angle changes, and with correspondingly varying resulting reactive forces set up in various zones of the resilient material in different phases of the angular movement.

It is found that the above combination of resilient cushions alternately increased and decreased in compression by relative angular movements between the respectively associated face portions, provides a mounting structure which, without need of extraneous counterbalancing structure, will largely relieve the adjacent floor or equivalent supporting framework from vibrations which otherwise are prone to be transmitted to the floor to an objectionable extent, and at the same time provides a mounting which enables the conveyor or like member to be vibrated, to respond readily to the vibratory forces applied thereto. The mounting is simple and economical, rugged and long lived, and is self-restoring in the sense that except as the vibratory forces compel otherwise, the reactive forces due to variation in compression of the rubber cushions, tend to restore the arms 3 to a median position in which the compressive forces in the portions of the resilient cushions which are on opposite sides of the axis Y, are balanced.

As indicated at the left of Fig. 1, the above described mounting structure may be used in conjunction with a spring 10, which will not be described in detail since appropriate forms thereof are known in the art, but in some instances the resilient cushions themselves may be relied upon to apply all of the restoring or resistive forces which are applied to the member 1, in conjunction with mechanism which initiates its vibratory motion.

Fig. 3 illustrates a somewhat modified form of the invention wherein the arm 11 has an end portion 12 extending at a right angle thereto to constitute one of the face portions above referred to. The face portion *4a* of Fig. 3 may be regarded as the same as above described in connection with Figs. 1 and 2, and likewise as to the resilient cushion 7. In Fig. 3, however, I have shown an additional resilient cushion 13 which seats against the opposite face of the face portion 12, bolts 14 being shown in Fig. 3 which are comparable to the bolts 8 or *8b* previously described, except that they pass through an additional pressure-distributing plate 15 which is applied to the cushion 13. The washers 16 of Fig. 3 may be understood as comparable to the washers 9 or *9b* previously described. Thus in the embodiment of the invention shown in Fig. 3, the variations in compressive effect as above described are distributed between the cushions 7 and 13, which may be of advantage for example in connection with larger amplitudes of vibration.

While the invention has been disclosed as embodied in mounting structure of the above described specific form, it should be understood that changes may be made therein without departing from the invention in its broader aspects, within the scope of the appended claims.

I claim:

1. A mounting structure of the character described for controlling the vibratory movement of a conveyor with respect to its supporting framework, said mounting structure comprising a relatively inflexible arm having an intermediate portion and a face portion at one of its opposite ends which is directed transversely with respect to said intermediate portion, fixtures connected respectively to the conveyor and the supporting framework for coupling the opposite end portions of said arm respectively to the conveyor and framework, one of said fixtures having a face portion disposed outwardly of and which is juxtaposed with respect to the aforesaid transversely directed face portion of said arm, a resilient cushion of rubberlike material also juxtaposed with respect to said juxtaposed face portions, and a plurality of clamping members passing through said juxtaposed face portions to cause said face portions to move angularly one with respect to the other as the conveyor vibrates, said clamping members being transversely offset with respect to the intermediate portion of said arm, said clamping members each having parts gripping the aforesaid juxtaposed face portions to hold the latter in juxtaposed relation.

2. A mounting structure of the character described for controlling the vibratory movements of a conveyor with respect to its supporting framework, said mounting structure comprising a relatively inflexible arm having an intermediate portion and a face portion at one of its opposite ends which is directed transversely with respect to said intermediate portion, fixtures connected respectively to the conveyor and the supporting framework for coupling the opposite end portions of said arm respectively to the conveyor and framework, one of said fixtures having a face portion disposed outwardly of and which is juxtaposed with respect to the aforesaid transversely directed face portion of said arm, a resilient cushion of rubberlike material also juxtaposed with respect to said juxtaposed face portions, and a plurality of clamping members passing through said juxtaposed face portions to cause said face portions to move angularly one with respect to the other as the conveyor vibrates, said clamping members being transversely offset with respect to the intermediate portion of said arm, said clamping members each having parts gripping the aforesaid juxtaposed face portions to hold the latter in juxtaposed relation and a convexly faced plate member also juxtaposed with respect to one of said face portions, said clamping members being in clamping relation to said plate member.

3. A mounting structure of the character described for controlling the vibratory movements of a conveyor with respect to its supporting framework, said mounting structure comprising a relatively inflexible arm having an intermediate portion having a transversely directed face portion at each of its opposite ends to provide a structure which is I shaped in longitudinal section, fixtures connected respectively to the conveyor and to the supporting framework for coupling the opposite end portions of said arm respectively to the conveyor and framework, each of said fixtures having a face portion which is disposed outwardly of and juxtaposed with respect to one of the aforesaid face portions of said arm, resilient cushions of rubberlike material which are interposed respectively between said juxtoposed face portions, the aforesaid structure being provided at each end thereof with a plurality of clamping members passing through the corresponding juxtaposed face portions to cause said corresponding face portions to move angularly one with respect to the other as the conveyor vibrates, said clamping members being each transversely offset with respect to the intermediate portion of said arm, and each having parts gripping the corresponding juxtaposed face portions to hold the latter in juxtaposed relation.

References Cited in the file of this patent

UNITED STATES PATENTS

| | | |
|---|---|---|
| 1,200,497 | Hosford | Oct. 10, 1916 |
| 2,367,070 | Symons | Jan. 9, 1945 |
| 2,706,112 | Carrier | Apr. 12, 1955 |

FOREIGN PATENTS

| | | |
|---|---|---|
| 409,440 | Great Britain | May 3, 1934 |